United States Patent
Piacibello

(10) Patent No.: US 8,032,788 B2
(45) Date of Patent: Oct. 4, 2011

(54) SYSTEM AND METHOD FOR MANAGING THE RESTARTING OF AUTOMATIC CONTROL EQUIPMENT

(75) Inventor: Jacques Piacibello, Antibes (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 792 days.

(21) Appl. No.: 12/101,615

(22) Filed: Apr. 11, 2008

(65) Prior Publication Data

US 2008/0269918 A1 Oct. 30, 2008

(30) Foreign Application Priority Data

Apr. 24, 2007 (FR) ...................................... 07 54653

(51) Int. Cl.
*G06F 11/00* (2006.01)
(52) U.S. Cl. .......................................... 714/23; 714/24
(58) Field of Classification Search .................... 714/14, 714/22, 23, 24
See application file for complete search history.

(56) References Cited

U.S. PATENT DOCUMENTS

| | | | | |
|---|---|---|---|---|
| 6,681,354 B2 * | 1/2004 | Gupta | ............................ | 714/725 |
| 7,222,268 B2 * | 5/2007 | Zaifman et al. | ................. | 714/47 |
| 7,809,992 B2 * | 10/2010 | Kulidjian et al. | ............... | 714/47 |
| 2005/0188068 A1 * | 8/2005 | Kilian | ........................... | 709/223 |
| 2006/0274622 A1 * | 12/2006 | De Boer | ..................... | 369/53.43 |
| 2008/0155319 A1 * | 6/2008 | Duncan et al. | .................. | 714/13 |

FOREIGN PATENT DOCUMENTS

| | | |
|---|---|---|
| EP | 0 393 631 | 10/1990 |
| EP | 1 562 112 A1 | 8/2005 |

* cited by examiner

*Primary Examiner* — Scott Baderman
*Assistant Examiner* — Sarai Butler
(74) *Attorney, Agent, or Firm* — Oblon, Spivak, McClelland, Maier & Neustadt, L.L.P.

(57) ABSTRACT

The present invention relates to a method for managing the restarting of automatic control equipment, consisting in:

Figure 1:
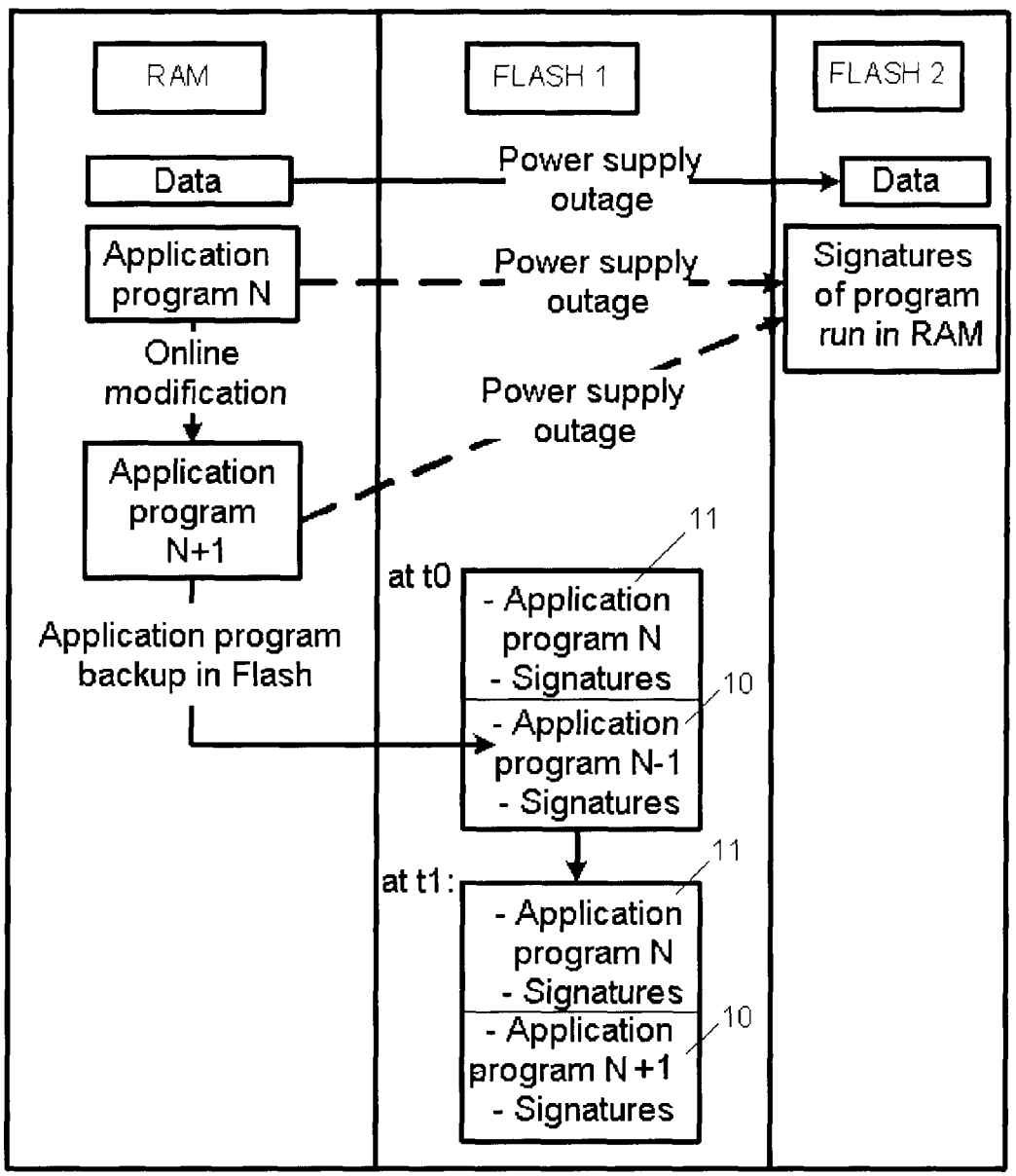

backing up, on an outage of the main electrical power supply, in a non-volatile memory (Flash 2) of the automatic control equipment, the data and a signature (LID') associated with the mapping of the data in the volatile memory (RAM) of the application program which is running at the time of the outage, after the end of the main electrical power supply outage, reloading the application program into the volatile memory (RAM) from a backup available in another non-volatile memory (Flash 1), comparing the signature (LID') with a signature backed up (LID) to decide on a restart of the automatic control equipment.

23 Claims, 3 Drawing Sheets

SYSTEM AND METHOD FOR MANAGING THE RESTARTING OF AUTOMATIC CONTROL EQUIPMENT

The present invention relates to automatic control equipment and to a method implemented in this automatic control equipment to manage the restarting of this equipment after a power supply outage.

The term "automatic control equipment" is used hereinafter to denote a programmable logic controller, a monitoring/control station, a digital control, or any automatic control module that can contain and run an application program for monitoring/controlling an automatic control application, such as, in particular, a variable speed drive or a logic module.

Automatic control equipment comprises a central processing unit (CPU) and at least one input/output module providing the link between the central processing unit and sensors and preactuators of the automatic control application to be controlled.

Normally, automatic control equipment like a programmable logic controller is of modular construction, that is, it consists of a number of modules which intercommunicate via a backplane bus. A programmable logic controller typically comprises:
  a power supply module for supplying the various voltages to the other modules via the backplane bus and signalling mains outages,
  a rack for mechanically securing the modules and supporting the backplane bus to which the modules are electrically connected,
  a central processing unit module which comprises at least one processor, a non-volatile memory, normally not modifiable (ROM type), or modifiable (EEPROM or FLASH type), containing the manufacturer program ("firmware") expressed in a language specific to the manufacturer of the automatic control equipment, a volatile memory and an input/output manager, which intercommunicate. The volatile memory (RAM type) contains, in a first area, the application program (also called user program) and, in a second area, the data, in particular the images of the states of the input/output modules,
  several input/output modules of various types according to the process to be controlled,
  one or more modules for communicating with communication networks (Ethernet, etc.) or control interfaces such as screen, keyboard, etc.

Hereinafter in the description, it is defined that:
  On a cold startup or restart of the logic controller, the processing of the application program resumes at the start and all the data (inputs/outputs, etc.) is initialized.
  On a hot startup or restart of the logic controller after an electrical power supply outage, the processing of the application program resumes at the start and the data that was backed up at the time of the outage is reloaded into volatile memory.

In a known manner, the application program is stored and run in the volatile memory and is backed up in a non-volatile memory of flash type, to be recovered in the event of a power supply outage. It is commonplace to have to modify the application program, for example by using a programming station. These modifications can be made online when the application program is stored and run in the volatile memory. When the modifications are finished, the modified application program is run in the volatile memory and progressively backed up in the non-volatile flash memory. The backing up of the modified application program therefore does not take place before its first run in the volatile memory.

However, when a power supply outage occurs when the application program is currently being modified or has already been modified, but is not totally backed up in the non-volatile flash memory, all the modifications are lost. Currently, in this situation, on restart, the automatic control equipment reloads into the volatile memory, from the non-volatile flash memory, the latest version of the application program available before the modification. To guarantee consistency between the data and the reloaded application program, the automatic control equipment is then restarted cold.

However, in some cases, if the modifications are minor or do not affect the mapping of the data of the application program, the cold restart after the end of the power supply outage is not necessary.

The aim of the invention is therefore to propose automatic control equipment and a method implemented in this automatic control equipment making it possible to decide on a hot or cold restart after a power supply outage.

This aim is achieved by a method for managing the restarting of automatic control equipment, said automatic control equipment comprising:
  a main electrical power supply,
  a volatile memory containing data and an application program for controlling and/or monitoring a process to be automated,
  at least one first non-volatile memory containing a backup of a version of the application program and a first signature associated with the mapping of the data of this application program in the volatile memory,
  said method being characterized in that it consists in:
  backing up, on an outage of the main electrical power supply, in a second non-volatile memory of the automatic control equipment, the data and a second signature associated with the mapping of the data, in the volatile memory, of the application program which is running at the time of the outage,
  after the main electrical power supply has been restored, reloading the application program into the volatile memory from the first non-volatile memory,
  comparing the first signature and the second signature to decide on a hot or cold restart of the automatic control equipment.

According to a particular feature, if the first signature and the second signature are different, the restart takes place cold.

According to another particular feature, the first flash memory stores a third signature representing a creation index of the application program stored in the first flash memory, the method consisting in:
  backing up, in the second flash memory, at the time of the main electrical power supply outage, a fourth signature representing a creation index of the application program which was loaded in the volatile memory at the time of the outage,
  comparing, for example using comparison means, the third signature and the fourth signature to decide on the restart of the automatic control equipment.

According to another particular feature, if the third signature and the fourth signature are different, the restart takes place cold.

According to another particular feature, the first flash memory stores a fifth signature representative of the deletion of variables in the application program stored in the first flash memory. The method then consists in:
  backing up, in the second flash memory, at the time of the main electrical power supply outage, a sixth signature representative of the deletion of the variables in the application program which was loaded in the volatile memory at the time of the outage, comparing, for example using comparison means, the fifth signature and the sixth signature to decide on the restart of the automatic control equipment.

According to another particular feature, if the fifth signature and the sixth signature are different, the restart takes place cold.

According to another particular feature, the first volatile memory comprises two memory areas, each storing a different version of the application program, a first version and a second version immediately prior to the first version.

The invention also relates to automatic control equipment which comprises:
- a main electrical power supply,
- a volatile memory containing data and an application program for controlling and/or monitoring a process to be automated,
- at least one first non-volatile memory containing a backup of a version of the application program and a first signature associated with the mapping of the data of this application program in the volatile memory, said equipment being characterized in that it comprises:
- a second non-volatile memory,
- means for backing up, on an outage of the main electrical power supply, in the second non-volatile memory, the data and a second signature associated with the mapping of the data in the volatile memory of the application program which was running at the time of the outage,
- means for reloading the application program into the volatile memory from the first non-volatile memory after the main electrical power supply has been restored,
- means for comparing the first signature and the second signature to decide on a restart of the automatic control equipment.

According to the invention, the automatic control equipment comprises means for performing a cold restart if the first signature and the second signature are different.

According to the invention, the first volatile memory takes the form, for example, of a removable card.

Figure 2:
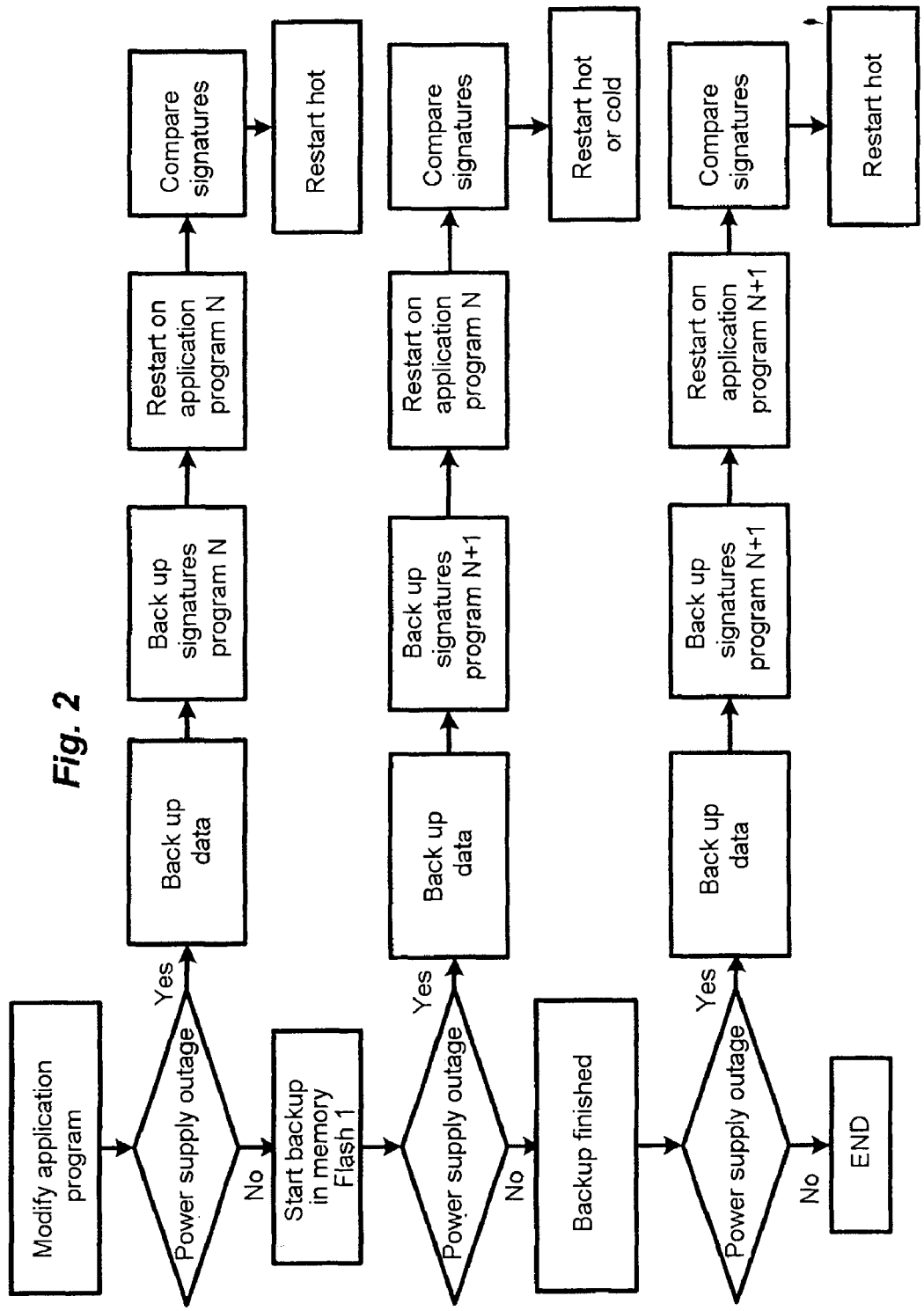
Figure 3:
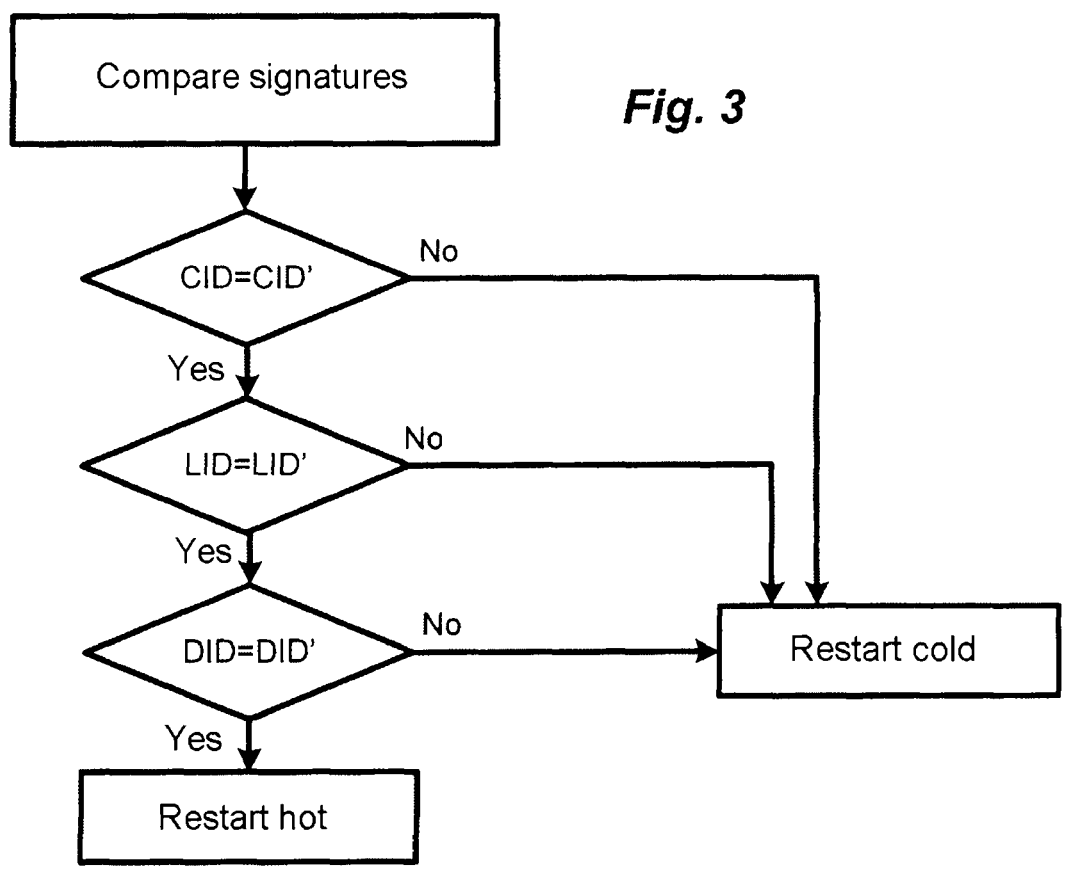

Other characteristics and advantages will emerge from the detailed description that follows with reference to an embodiment given by way of example and represented by the appended drawings in which:

FIG. 1 represents the storage means implemented in the automatic control equipment, FIG. 2 uses a flow diagram to illustrate the operation of the automatic control equipment on a power supply outage, FIG. 3 shows the second part of the flow diagram of FIG. 2.

The structure of automatic control equipment such as a programmable logic controller is well known. It is not therefore detailed in this application.

A programmable logic controller is powered by a main electrical power supply and comprises a central processing unit connected via a backplane bus to several input/output modules and provided with a microprocessor and various storage means. The central processing unit notably contains a volatile memory, normally of RAM type, intended to store data and an application program (also called user program) run to drive a process to be automated. The storage means also comprise a non-volatile memory of ROM type, modifiable or not, storing the manufacturer program (also called "firmware").

Furthermore, according to the invention, the storage means also comprise a first non-volatile memory of SD (Secure Digital) flash NAND type, hereinafter denoted first flash memory (designated Flash 1 in FIG. 1), provided with two different memory areas 10, 11, in each of which is backed up a different version of the application program. The first memory area 10 stores, for example, the version (hereinafter designated version N−1) of the application program immediately prior to that currently running and the second memory area 11 stores the version (hereinafter designated version N) of the application program currently running in the volatile memory (RAM). Each time the application program is modified, the new version of the program is backed up in this first flash memory (Flash 1) and replaces the oldest version. Thus, after the backup of a new version (at t1), the first flash memory (Flash 1) contains in its first memory area 10 a new version (hereinafter designated version N+1) of the application program and, in its second memory area 11, the immediately prior version (N) (FIG. 1).

The first flash memory (Flash 1) can, for example, be removable, which means that it can be replaced, when the microprocessor is powered down, by a similar card containing, for example, a modified version of the application program, such as a new version of the application program.

For each version of the application program, several signatures are generated and stored in the first flash memory (Flash 1) with the application program with which they are associated. These signatures are as follows:

A first signature CID (for "Creation ID") corresponds to a creation index of the code of the application program. This signature is generated on creation of the application program and is then no longer modifiable.

A second signature MID (for "Modification ID") corresponds, for example, to a modification index of the code of the application program. This signature MID is modified each time the application program is modified.

A third signature LID (for "Layout ID") is, for example, associated with the mapping of the data of the application program in the volatile memory. Each time this mapping is modified, the signature LID is modified. For example, if a new program block containing new data is created in the application program, the signature LID is modified. If the signature LID is modified the signature MID is also modified.

A fourth signature DID (for "Deletion ID") is, for example, an index flagging the deletion of data within the application program. If the signature DID is modified, the signature MID is also modified.

The storage means also comprise a second non-volatile memory of flash type, hereinafter denoted second flash memory (designated Flash 2 in FIG. 1), designed to store the data present in the volatile memory (RAM) at the time of a main electrical power supply outage. This second flash memory (Flash 2) will, for example, feature fast writing so that the data at the time of the power supply outage can be written therein rapidly.

According to the invention, this second flash memory is also designed to accommodate the signatures CID', MID', LID', DID' of the application program that is currently running in the volatile memory (RAM) at the time of a power supply outage (FIG. 1, broken lines). These signatures have a structure that is identical to those written in the first flash memory (Flash 1) for each backup of the application program.

An auxiliary electrical power supply, consisting, for example, of a capacitor, is employed to ensure the power supply to the volatile memory for the time it takes to write the data and the signatures in the second flash memory (Flash 2) at the time of the main electrical power supply outage.

According to the invention, with reference to FIG. 2, when a main electrical power supply outage occurs, the automatic control equipment systematically performs a backup, in the second flash memory (Flash 2), of the data and of the signatures CID', MID', LID', DID' representative of the application program currently running in the volatile memory (FIG. 1).

Then, after the electrical power supply has been restored, depending on the time at which the main electrical power supply outage occurred, the automatic control equipment performs a hot or cold restart.

Referring to the flow diagram represented in FIG. 2, if the main electrical power supply outage occurs when the application program is currently being modified in the volatile memory (RAM) which is not backed up, all the modifications are lost. The version N+1 of the application program has not therefore yet been backed up in the first flash memory (Flash 1). Since the modifications are in progress at the time of the outage, the program run in the volatile memory (RAM) was then not yet at version N+1 but at version N. The second flash memory (Flash 2) therefore contains the data and the signatures of the application program of version N.

After the end of the electrical outage, on the restart, the automatic control equipment therefore reloads the most recent version of the application program which is available in the first flash memory (Flash 1), namely version N. To decide on a hot or cold restart, the automatic control equipment uses comparison means to compare the signatures CID, LID, DID of the reloaded application program originating from the first flash memory (Flash 1) and the signatures CID', LID', DID' of the application program stored in the second flash memory (Flash 2) at the time of the outage. Given that the application program run in the volatile memory (RAM) at the time of the outage was version N, these signatures have not been modified compared to those backed up in the first flash memory. Consequently, the automatic control equipment can restart hot.

If the main electrical power supply outage occurs when the application program has been modified and is currently running in the volatile memory (RAM) but not yet backed up in the first flash memory (Flash 1), the situation is different. The application program run in the volatile memory (RAM) is version N+1 whereas the most recent version available in the first flash memory (Flash 1) is version N. After the end of the main electrical power supply outage, the restart of the automatic control equipment therefore takes place on version N of the application program. On the other hand, the signatures CID', LID', DID' backed up at the time of the outage in the second flash memory (Flash 2) are those produced on the application program of version N+1 which was then currently running at the time of the outage. In this situation, before restarting, the automatic control equipment must compare the signatures CID', LID', DID' obtained from the second flash memory (Flash 2) with the signatures CID, LID, DID obtained from the first flash memory (Flash 1) and relating to the reloaded program, and check whether each of these signatures has been modified between the version N+1 and the version N.

Referring to FIG. 3, if the signature CID is different from the signature CID', the restart will take place cold. If, however, the signature CID is identical to the signature CID', the automatic control equipment then compares the signature LID with the signature LID'. If the signature LID, representative of the mapping of the data of the application program in the memory, is different from the signature LID', the restart will take place cold. On the other hand, if this signature LID is identical to the signature LID', the automatic control equipment compares the signature DID with the signature DID'. If this signature DID is different from the signature DID', the restart will take place cold. On the other hand, if this signature DID is identical to the signature DID', the restart will take place hot. To sum up, if none of these three signatures is modified, the restart can be performed hot but if at least one of these signatures is modified, the restart must be performed cold. Of course, the order of the comparisons between the signatures can be modified and in no way influences the operation of the automatic control equipment on the restart.

Finally, if the main electrical power supply outage occurs when the backup of the modified application program is finished, the restart after the end of the outage can then take place on version N+1 of the application program which is then available in the first flash memory (Flash 1). This restart can be performed hot because the signatures of the program running (the version N+1) in the volatile memory (RAM) at the time of the outage are identical to those stored in the first flash memory (Flash 1).

Regarding the MID signature, its modification alone between the versions N and N+1 of the application program is not sufficient to require the cold restart of the automatic control equipment after a power supply outage.

According to the invention, if the first flash memory (Flash 1) employed is removable and replaced, when the microprocessor is powered down, with a similar card, a comparison of the signatures is also necessary on the restart. If the new card stores a new application program, its signature CID is different from that of the application program run previously in the volatile memory. In this case, as described above, the restart will take place cold.

It is clear that it is possible, without departing from the scope of the invention, to devise other variants and refinements of detail and even consider the use of equivalent means.

The invention claimed is:

1. A method for managing the restarting of automatic control equipment, said automatic control equipment comprising:
   a main electrical power supply,
   a volatile memory containing data and an application program for controlling and/or monitoring a process to be automated,
   at least one first non-volatile memory containing a backup of a version of the application program and a first signature associated with the mapping of the data of this application program in the volatile memory,
   said method comprising:
   backing up, on an outage of the main electrical power supply, in a second non-volatile memory of the automatic control equipment, the data and a second signature associated with the mapping of the data, in the volatile memory, of the application program which is running at the time of the outage;
   after the main electrical power supply has been restored, reloading the application program into the volatile memory from the first non-volatile memory; and
   comparing the first signature and the second signature;
   performing either a hot or cold restart of the automatic control equipment based on a result of the comparing.

2. The method according to claim 1, wherein, if the first signature and the second signature are different, the restart takes place cold.

3. The method according to claim 1 or 2, wherein the first flash memory stores a third signature representing a creation index of the application program stored in the first flash memory, and the method further comprises backing up, in the second flash memory, at the time of the main electrical power supply outage, a fourth signature representing a creation index of the application program which was loaded in the volatile memory at time of the outage; and comparing the third signature and fourth signature to decide on the restart of the automatic control equipment.

4. The method according to claim 3, wherein, if the third signature and the fourth signature are different, the restart takes place cold.

5. The method according to claim 1, wherein the first flash memory stores a fifth signature representative of the deletion of variables in the application program stored in the first flash memory, and the method further comprises:

backing up, in the second flash memory, at the time of the main electrical power supply outage, a sixth signature representative of the deletion of the variables in the application program which was loaded in the volatile memory at the time of the outage; and comparing the fifth signature and the sixth signature to decide on a hot or cold restart of the automatic control equipment.

6. The method according to claim 5, wherein if the fifth signature and the sixth signature are different, the restart takes place cold.

7. The method according to claim 1, wherein the first volatile memory comprises two memory areas, each storing a different version of the application program, a first version and a second version immediately prior to the first version.

8. An automatic control equipment comprising:

a main electrical power supply, a volatile memory containing data and an application program for controlling and/or monitoring a process to be automated, at least one first non-volatile memory containing a backup of a version of the application program and a first signature associated with the mapping of the data of this application program in the volatile memory;

a second non-volatile memory, means for backing up, on an outage of the main electrical power supply, in the second non-volatile memory, the data and a second signature associated with the mapping of the data in the volatile memory of the application program which was running at the time of the outage, means for reloading the application program into the volatile memory from the first non-volatile memory after the main electrical power supply has been restored, means for comparing the first signature and the second signature;

means for performing either a hot or cold restart of the automatic control equipment based on a result of the means for comparing.

9. The automatic control equipment according to claim 8, wherein the means for performing performs a cold restart if the first signature and the second signature are different.

10. The automatic control equipment according to claim 8 or 9, wherein the first flash memory stores a third signature representing a creation index of the application program stored in the first flash memory, and at the time of the main electrical power supply outage, the second flash memory stores a fourth signature representing a creation index of the application program which was loaded in the volatile memory at the time of the outage, and the means for comparing compares the third signature and the fourth signature and provides a result to the means for performing to decide on the hot or cold restart of the automatic control equipment.

11. The automatic control equipment according to claim 10, wherein if the third signature and the fourth signature are different, the restart takes place cold.

12. The automatic control equipment according to claim 8, wherein the first flash memory stores a fifth signature representative of the deletion of variables in the application program stored in the first flash memory, and at the time of the main electrical power supply outage, the second flash memory stores a sixth signature representative of the deletion of variables in the application program which was loaded in the volatile memory at the time of the outage, and the means for comparing compares the fifth signature and the sixth signature and provides a result to the means for performing to decide on the restart of the automatic control equipment.

13. The automatic control equipment according to claim 12, wherein if the fifth signature and the sixth signature are different, the restart takes place cold.

14. The automatic control equipment according to claim 8, wherein the first volatile memory comprises two memory areas each storing a different version of the application program.

15. The automatic control equipment according to claim 8, wherein the first volatile memory is a removable card.

16. An automatic control equipment comprising:

a main electrical power supply, a volatile memory containing data and an application program for controlling and/or monitoring a process to be automated, at least one first non-volatile memory containing a backup of a version of the application program and a first signature associated with the mapping of the data of this application program in the volatile memory;

a second non-volatile memory for backing up, on an outage of the main electrical power supply, in the second non-volatile memory, the data and a second signature associated with the mapping of the data in the volatile memory of the application program which was running at the time of the outage, a reloading unit configured to reload the application program into the volatile memory from the first non-volatile memory after the main electrical power supply has been restored, a comparing unit configured to compare the first signature and the second signature;

a restarting unit configured to perform either a hot or cold restart of the automatic control equipment based on a result of the comparing unit.

17. The automatic control equipment according to claim 16, wherein the restarting unit performs a cold restart if the first signature and the second signature are different.

18. The automatic control equipment according to claim 16, wherein the first flash memory stores a third signature representing a creation index of the application program stored in the first flash memory, and at the time of the main electrical power supply outage, the second flash memory stores a fourth signature representing a creation index of the application program which was loaded in the volatile memory at the time of the outage, and the comparing unit compares the third signature and the fourth signature and provides a comparison result to the restarting unit to decide on the hot or cold restart of the automatic control equipment.

19. The automatic control equipment according to claim 18, wherein if the third signature and the fourth signature are different, the restarting unit performs the cold restart.

20. The automatic control equipment according to claim 16, wherein the first flash memory stores a fifth signature representative of the deletion of variables in the application program stored in the first flash memory, and at the time of the main electrical power supply outage, the second flash memory stores a sixth signature representative of the deletion of variables in the application program which was loaded in the volatile memory at the time of the outage, and the comparing unit compares the fifth signature and the sixth signature and provides a result to the restarting unit to decide on the restart of the automatic control equipment.

21. The automatic control equipment according to claim 20, wherein if the fifth signature and the sixth signature are different, the restarting unit performs the cold restart.

22. The automatic control equipment according to claim 16, wherein the first volatile memory comprises two memory areas each storing a different version of the application program.

23. The automatic control equipment according to claim 16, wherein the first volatile memory is a removable card.

* * * * *